United States Patent [19]

Parker, deceased et al.

[11] 3,874,509

[45] Apr. 1, 1975

[54] PRESSURE SCREEN AND SURGE TANK

[75] Inventors: Joseph D. Parker, deceased, late of Roscoe, Ill. by Dorothy C. Parker, executrix; Shu Tang Han, South Beloit; Richard E. Hergert, Rockton, both of Ill.

[73] Assignee: Beloit Corporation, Beloit, Wis.

[22] Filed: Nov. 6, 1972

[21] Appl. No.: 303,935

[52] U.S. Cl.................. 209/240, 209/258, 209/273, 209/370
[51] Int. Cl............................................. B07b 1/04
[58] Field of Search ........... 209/258, 250, 268, 273, 209/305, 306, 271, 17, 370–372, 240, 355, 358; 210/349, 386

[56] References Cited
UNITED STATES PATENTS

| 192,750 | 7/1877 | Foley | 210/349 |
|---|---|---|---|
| 795,823 | 8/1905 | Darling | 209/273 X |
| 829,503 | 8/1906 | Cady | 210/349 |
| 896,471 | 8/1908 | Seymour | 209/273 X |
| 1,368,422 | 2/1921 | Beaven | 209/273 |
| 2,679,193 | 5/1954 | Cran | 209/271 |
| 2,708,032 | 5/1955 | Heyman | 209/273 X |
| 3,074,553 | 1/1963 | Szedan | 209/273 |
| 3,223,239 | 12/1965 | Dick | 209/273 X |
| 3,363,759 | 1/1968 | Clarke-Pounden | 209/273 |
| 3,679,055 | 7/1972 | Clark | 210/349 X |

FOREIGN PATENTS OR APPLICATIONS

| 693,671 | 9/1964 | Canada | 209/250 |
|---|---|---|---|
| 740,663 | 5/1943 | Germany | 209/306 |

Primary Examiner—Robert Halper
Attorney, Agent, or Firm—Hill, Gross, Simpson, Van Santen, Steadman, Chiara & Simpson

[57] ABSTRACT

A paper machine screen mechanism with a circular surge tank and an air dome and a pair of screens coaxial within the tank discharging into the tank so that the pressure therein controls the flow through the screens and a central inlet leading to the screens with a rotatable foil moving past the screens and a controlled reject outlet leading from the foil chamber.

11 Claims, 2 Drawing Figures

PRESSURE SCREEN AND SURGE TANK

BACKGROUND OF THE INVENTION

The invention relates to improvements in paper making machines and more particularly to improved screen mechanism for screening paper stock to remove foreign elements such as shives, chips, knots, dirt, large particles and the like.

In the screening operation for the preparation of stock for paper making the principal objective is of course to obtain optimum of screening so that the maximum amount of foreign particles are removed from the stock to produce the cleanest and highest quality of stock obtainable. In accomplishing this procedure it is necessary to have control over the flow rate of the stock and to control its flow and pressures during screening to thereby obtain good screening with varying stock conditions. Different stock can vary in the amount of reject material which it contains and it can vary in the nature of the stock itself so that an effective and efficient screen mechanism must be controllable to accommodate these changes and to keep the rejects from the acceptable stock yet not withdraw an excessive amount of reject material. It is also necessary to provide a screening mechanism which has a high capacity so that continuous high volume flow can be accommodated under suitable screening conditions.

It is accordingly an object of the present invention to provide an improved stock screening mechanism which obtains improved pressure and flow control conditions to thereby obtain improved screening and a superior stock.

A further object of the invention is to provide a stock screening mechanism which requires the minimum of space for maximum screening capacity.

A still further object of the invention is to provide an improved stock screening mechanism which is relatively less expensive to construct and maintain and wherein the screens and other parts can be serviced.

Yet another object of the invention is to provide a stock screening mechanism which has large capacity screens and wherein the reaction between the stock and the screens is not very substantially different for screening through different areas in the screen element.

Other objects, advantages and features, as well as equivalent structures which are intended to be covered hereby, will become more apparent to those versed in the art in connection with the teaching of the principles of the present invention with the disclosure of the preferred embodiment in the specification, claims and drawings, in which:

DESCRIPTION OF THE PREFERRED EMBODIMENTS

Figure 1:
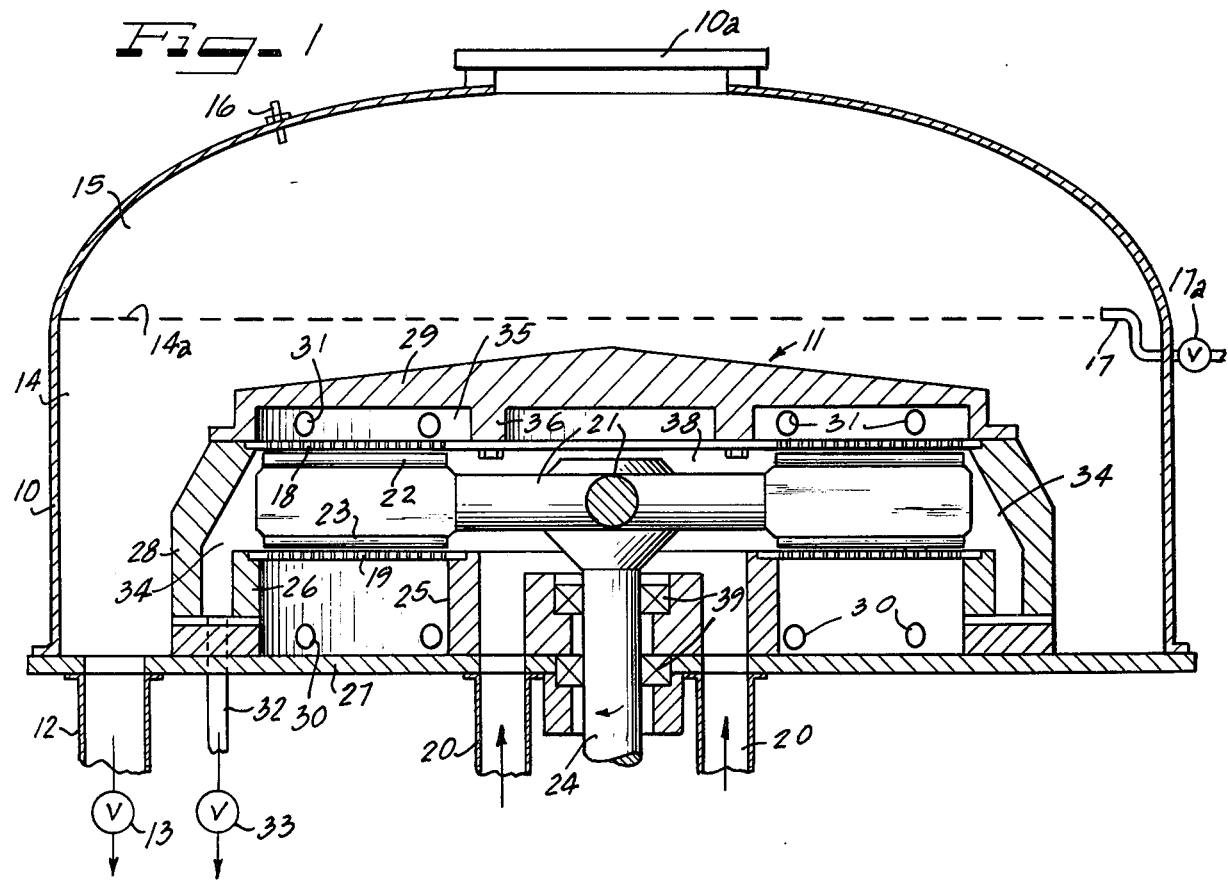
FIG. 1 is a somewhat schematic vertical sectional view taken through the axial center of a stock screening mechanism constructed and operating in accordance with the principles of the present invention.

FIG. 1 illustrates a circular stock surge tank 10 which has a thin skin air dome at the top. Centrally located within the surge tank is the screening mechanism 11. Outwardly of the screening mechanism, and within the surge tank, the tank is filled with screened stock 14 having a free surface 14a with an air chamber 15 above the stock. Air is admitted into the air chamber through an inlet 16 which is at the controlled pressure point. Screened stock is removed from the chamber 10 through an outlet 12 controlled by a valve 13 and the pressure within the surge tank is controlled by the rate at which the stock is withdrawn as regulated by the setting of the valve 13 and the pressure of the air injected into the dome through the inlet 16. The liquid level can be maintained by a skimming outlet 17 by which can also be used to draw froth and lightweight floating material off of the surface wherein the outlet is controlled by a valve 17a.

Access to the top of the dome is through a large manhole cover 10a which is removable and which is held in place by suitable clamping mechanism not shown.

The screened material, or in other words, the screen accepts are discharged into the surge tank from the screening mechanism 11 and thus the largest possible area is allocated to the surge tank itself, independently of the size of the screening mechanism 11. By having the surge volume on the accept side of the screen, the surge tank functions as an effective surge control to suppress not only the pressure variations resulting from the screen but those originating upstream of the screen. The design provides a space saving advantage by essentially locating the screen inside of the surge tank. Also with this arrangement the inlet flow into the surge tank does not disturb the free surface because it occurs over a large area and contains such small scale turbulence resulting from passage through the screens.

The screen mechanism is located within an annular housing 28 centrally located within the tank 10, having a cover 29 bolted thereto. The discharge from the screen is communicated directly to the tank 10 such as by openings 30 and 31 through the wall 28 and the cover 29. Arrangements other than the circular openings illustrated may be employed, such as the wall 28 being formed of vertically spaced columns having substantially large openings therethrough, and similarly the cover 29 may have separated supporting webs or columns with openings therethrough communicating directly into the stock material 14 within the tank 10.

The screens comprise annular screen plates 18 and 19 which extend horizontally and coaxially within the tank. The upper plate 18 is clamped between the cover 29 and the wall 28 and is additionally supported by an annular rib 36 on the cap 29 at its center.

The lower annular screen plate 19 is supported on annular walls 25 and 26 extending upwardly from the floor 27 of the tank 10. The screens essentially have a flat disc shape, and the top screen plate 18 can be one piece and the bottom screen plate 19 is preferably formed in sectors held firmly in place by suitable means.

Between the screens 18 and 19 is a foil chamber which receives the incoming stock, with the stock flowing axially upwardly and downwardly through the screens and the rejected material flowing radially outwardly into the annular chamber 34. An outlet 32 leads from the chamber 34 and reject flow is controlled through a valve 33.

Within the foil chamber is a rotatable foil rotor 21 which has spokes carrying upper and lower foils 22 and 23. These foils may take various shapes although may be tear drop shaped in a manner which will be recognized with those versed in the art. The foils rotate within the foil chamber 38. The pressure surges aid in carrying the screened stock through the openings in the screens 18 and 19. The foil rotor 21 is driven by vertical upward extending shaft 24 supported from the floor of the tank by seals and bearings 39. Annularly disposed around the shaft 24 are stock inlet passages 20 which feed the stock upwardly into the foil chamber 38.

The radially oriented foil blades are radially straight and centrifugal forces generated by the rotation of the foils are parallel to the plane of the screen plates 18 and 19. As a result, dense material in the stock moves rapidly to the annular reject trough 34, but the rate of the radial flow of the unaccepted suspended fibers is regulated by the reject flow rate which is controlled by the valve 33. The intensity of the pulse as generated by the foils will vary radially upwardly across the screen plate increasing with the increasing radial distance from the center of the rotor 21. It is therefore necessary to operate at sufficiently high rotational speeds and to limit the minimum distance of the screen perforations from the center to permit effective screening over the entire screen area. However, because of the increased intensity in the radial direction of flow it is believed that the screening becomes less selective at increasing distances from the center. That is more shives, chips, large particles and other foreign particles pass through the screen at increasing distances from the center so that the unaccepted suspended material flows from a more selective to a less selective zone. This characteristic permits close control over the screening efficiency by adjustment of the reject flow rate.

The arrangement illustrated is a simple structural design basically circular in construction to provide a minimum of heavy support structure to withstand the pressures encountered. The structure provides easy access to the screen plates for cleaning and replacement.

Figure 2:
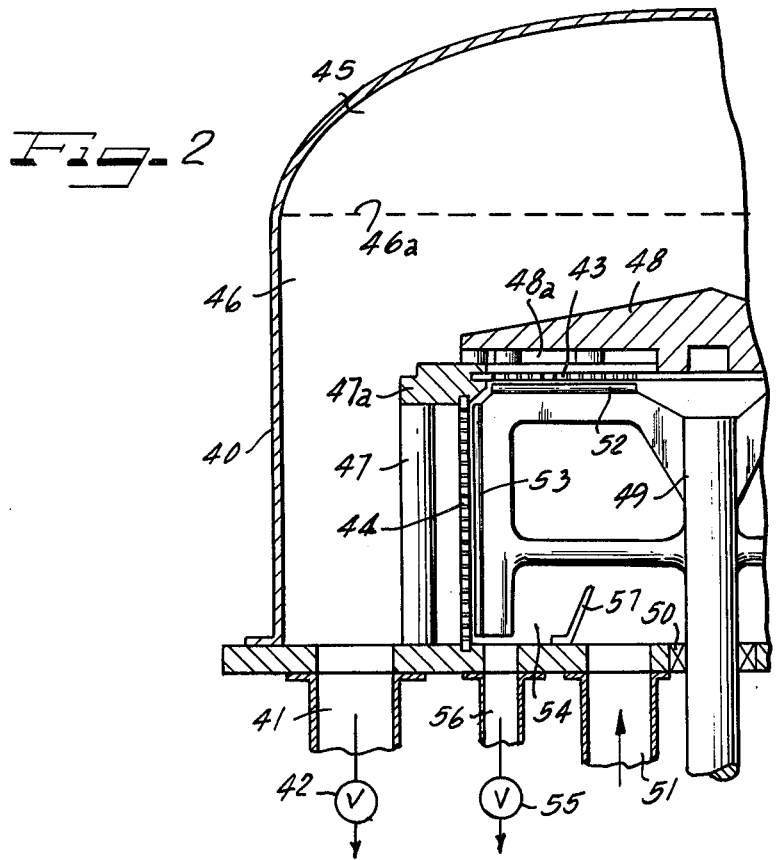
FIG. 2 is a vertical sectional view having substantially one-half of the mechanism removed, showing an alternative form of the invention.

FIG. 2 illustrates an alternative arrangement. One variation in the structure of FIG. 1 or FIG. 2 would be to admit the stock through the axial center of the drive shaft to the foils. This, however, would require a rotary seal between the stock pipe and the rotor and would require increased expense in rotor construction.

In the arrangement of FIG. 2 increased capacity is possible. For certain purposes FIG. 1 is the preferred arrangement because it does offer advantages and greater control over the screening efficiency and more efficient accumulation of reject particles.

FIG. 2 illustrates a circular tank 40, which is similar in construction to the tank of FIG. 1, and has accepted stock in the chamber 46 with an air chamber 45 thereabove, and the free surface shown at 46a. Discharge of the stock accepts is through the outer periphery of the tank through outlets such as 41 controlled by an accepts valve 42.

Centrally located within the tank is the screen mechanism which includes an outer support 47 with a cap 48. The support 47 and the outer edge of the cap 48 are provided with spokes or spindles to provide passages for the screened accepts to flow directly outwardly into the chamber 46.

An upper annular screen 43 is provided which is similar to the upper screen used in the arrangement of FIG. 1. Instead of the lower screen however, an annular cylindrically shaped screen 44 is provided.

Rejects are removed from the foil chamber 54 through rejects outlet 56 controlled by a valve 55. Stock is admitted to the foil chamber for screening through an inlet 51 and an annular baffle 57 is positioned between the inlet and the rejects outlet. Foils rotate past the screens carried on a foil rotor 49 which has an upwardly extending drive shaft that passes through a sealing bearing 50 in the floor of the tank. Foils 52 are carried on the rotor past the surface of the screen 43. Vertical foils 53 are carried past the cylindrical screen 44.

As will be observed, substantial areas are afforded by the cylindrical screen 44. The wall 47 may be suitably constructed such as by having a top annular ring 47a clamped in place to hold the cylindrical screen 44, and the cap 48 is suitably held in the top of the ring 47a.

We claim:

1. A paper machine screen mechanism comprising in combination:
   a cylindrical stock surge tank containing screened stock upper pressure and having an air dome for maintaining pressure within the tank;
   a screened stock outlet leading from the surge tank with valve means for controlling the flow of stock through said outlet;
   means for directing air under pressure into the dome for coacting with the valve means for controlling the pressure in said surge tank;
   a screen within the surge tank having a discharge communicating with the surge tank so that the flow rate through the screen is controlled by the surge tank pressure;
   a stock inlet feeding radially outwardly to said screen;
   and a reject outlet receiving rejects from the screen and positioned radially outwardly of the inlet and radially inwardly of the surge tank outlet.

2. A paper machine screen mechanism constructed in accordance with claim 1 and including plural screens coaxial with the surge tank.

3. A paper machine screen mechanism comprising in combination:
   a closed circular stock surge tank for containing screened stock under pressure and having an air chamber for containing cushioning air;
   a stock outlet leading from the surge tank with valve means for controlling the flow of stock through said outlet;
   pressure control means for controlling the pressure in said air chamber;
   an annular screen having a discharge communicating directly with said surge tank so that flow through the screen is controlled by the surge tank pressure;
   a stock inlet leading to said screen;
   and a reject outlet receiving rejects from the screen, said stock inlet being in one direction radially from the screen and said stock outlet being in the opposite radial direction from the screen so that the stock flows radially relative to the screen.

4. A paper machine screen mechanism constructed in accordance with claim 3:
   and including an air dome with means supplying pressurized air thereto for aiding and controlling the pressure in said surge tank.

5. A paper machine screen mechanism constructed in accordance with claim 1:

wherein said chamber and air dome are circular in shape and the screen is annular and positioned coaxial with the chamber.

6. A paper machine screen mechanism constructed in accordance with claim 1:
and including rotatably driven foils coacting with said screen positioned on the upstream side thereof.

7. A paper machine screen mechanism constructed in accordance with claim 1:
including a rotatable foil structure coaxial within the chamber;
and wherein said stock inlet is coaxially located relative to the chamber leading upwardly therein.

8. A paper machine screen mechanism constructed in accordance with claim 1:
wherein the screen is in the form of axially spaced annular screen plates coaxially located within the surge tank;
and wherein foils rotate between said screen plates and the reject outlet leads from the radial outer end of the space occupied by said foils.

9. A paper machine screen mechanism constructed in accordance with claim 1:
wherein the screen is in the form of one screen unit extending horizontally within the surge tank and another screen unit annular in shape and extending vertically at right angles to the first screen unit.

10. A paper machine screen mechanism constructed in accordance with claim 1:
wherein the screen includes first and second screen units coaxial within the surge tank;
a coaxially located rotating foil member carrying foils past the screens;
wherein said stock inlet is positioned radially outwardly of the drive shaft for said foils extending coaxially upwardly into the base of the tank;
and the reject outlet leads from the bottom of the tank positioned radially between the inlet and the outlet.

11. A paper machine screen mechanism constructed in accordance with claim 3:
and including a control valve for the reject outlet regulating the rate of flow therefrom and the flow of stock past the screen.

* * * * *

UNITED STATES PATENT OFFICE
CERTIFICATE OF CORRECTION

PATENT NO. : 3,874,509
DATED : April 1, 1975
INVENTOR(S) : Joseph D. Parker, Shu Tang Han and Richard E. Hergert It is certified that error appears in the above-identified patent and that said Letters Patent are hereby corrected as shown below:

Claim 1, line 4, change "upper" to --under--.

Signed and sealed this 24th day of June 1975.

(SEAL)
Attest:

RUTH C. MASON
Attesting Officer

C. MARSHALL DANN
Commissioner of Patents
and Trademarks